(12) United States Patent
Tanaglia

(10) Patent No.: US 7,208,543 B2
(45) Date of Patent: Apr. 24, 2007

(54) ETHYLENE-PROPYLENE COPOLYMERS WITH AN IMPROVED SHAPE STABILITY SUITABLE FOR MODIFYING LUBRICATING OILS AND PROCESS FOR THE PREPARATION THEREOF

(75) Inventor: Tiziano Tanaglia, Bologna (IT)

(73) Assignee: Polimeri Europa S.p.A., Brindisi (IT)

( * ) Notice: Subject to any disclaimer, the term of this patent is extended or adjusted under 35 U.S.C. 154(b) by 0 days.

(21) Appl. No.: 11/203,065

(22) Filed: Aug. 15, 2005

(65) Prior Publication Data

US 2006/0047072 A1   Mar. 2, 2006

(30) Foreign Application Priority Data

Aug. 27, 2004 (IT) .......................... MI04A001672

(51) Int. Cl.
*C08L 53/02* (2006.01)
*C10M 107/14* (2006.01)

(52) U.S. Cl. .................. 524/505; 525/98; 525/99; 525/197; 525/938; 528/481; 528/502 F; 585/12

(58) Field of Classification Search .......... 524/505; 525/98, 99, 197, 938; 585/12; 528/481, 528/502 F
See application file for complete search history.

(56) References Cited

U.S. PATENT DOCUMENTS

| 3,772,196 A | 11/1973 | St. Clair et al. |
| 4,081,390 A | 3/1978 | Richardson |
| 4,375,531 A | 3/1983 | Ross |
| 5,035,820 A * | 7/1991 | Rhodes et al. ............... 508/221 |
| 5,244,590 A * | 9/1993 | Chung et al. ............... 508/591 |

FOREIGN PATENT DOCUMENTS

| EP | 0 032 175 A2 | 7/1981 |
| EP | 0 360 440 A2 | 3/1990 |
| EP | 0 638 611 A1 | 2/1995 |
| EP | 1 013 673 A1 | 6/2000 |
| GB | 1 413 298 | 11/1975 |
| WO | WO 96/17041 | 6/1996 |

OTHER PUBLICATIONS

U.S. Appl. No. 11/294,569, filed Dec. 6, 2005, Tanaglia.
U.S. Appl. No. 11/203,065, filed Aug. 15, 2005, Tanaglia.
Database WPI; Section Ch; Week 199808; Derwent Publications Ltd., London, GB, Class A12; AN 1998 082810; XP002311963; May 24, 1996.

* cited by examiner

*Primary Examiner*—Fred Teskin
(74) *Attorney, Agent, or Firm*—Oblon, Spivak, McClelland, Maier & Neustadt, P.C.

(57) ABSTRACT

A process is described for the preparation of viscosity index improver (V.I.I.) additives which includes treatment under high shear conditions of a composition comprising (i) one or more EP(D)M polymers and (ii) one or more polyvinylarene/hydrogenated conjugated diene/polyvinylarene block copolymers, the weight ratio (i)/(ii) ranging from 98:2 to 80:20, preferably from 97:3 to 90:10, the above process being carried out at a temperature ranging from 150° C. to 400° C., preferably from 180° C. to 320° C.

19 Claims, 1 Drawing Sheet

Figure 1 is a photograph of the material of example 1 after 2 days at room temperature Figure 2 is a photograph showing the differences, after 2 days, between the test carried out with the product of invention example 3 (on the right) and that of comparative example 2 (on the left)

ETHYLENE-PROPYLENE COPOLYMERS WITH AN IMPROVED SHAPE STABILITY SUITABLE FOR MODIFYING LUBRICATING OILS AND PROCESS FOR THE PREPARATION THEREOF

The present invention relates to a method for obtaining low molecular weight ethylene-propylene copolymers and terpolymers by the degradation, in an extruder, of polymers having a higher molecular weight.

The method of the present invention allows amorphous or semi-crystalline EP(D)M polymers to be extruded (or related mixtures), obtaining products with a reduced molecular weight which can be used in the field of lubricating oil additives. The additives obtained according to the process of the present invention, belonging to the group of ethylene copolymers or terpolymers, are characterized by an improved shape stability which is such as to enable the product to be recovered by means of the normal equipment used in the field of plastic materials.

Elastomeric copolymers and terpolymers of ethylene (so-called EP(D)M) are widely used in the field of additives for lubricating oils (indicated in the field with the term OCP, olefin copolymer), and their characteristics have been widely studied.

Aspects relating to the molecular weight, molecular weight distribution and ethylene content of the additive, are extremely important when selecting the product to be used in the field.

The molecular weight of the polymer tends to increase the thickening capacity of the additive, or the capacity of increasing the viscosity under heat of the oil base. To ensure that the chains are stable under the high shear conditions of the lubricated parts of the engine, however, low molecular weights are generally preferred, which are difficult to obtain in polymerization plants.

For this reason, it can be preferable to modify the molecular weight of the polymer obtained under standard conditions in the polymerization plant, downstream, and subsequently degrade it.

As far as the composition of the OCP additive is concerned, high bound ethylene gives better rheological properties at a high temperature (thickening); as these additives are partially crystalline, however, they tend to form superstructures at low temperatures which reduce the properties of the oil upon the cold start of the engine, such as pumpability.

The properties cannot however be balanced through intermediate ethylene compositions as these have ethylene sequences (medium) capable of interfering with the pour point depressant additives of the oil, jeopardizing their activity and further deteriorating the low temperature rheology of the lubricating oil.

Semi-crystalline products mixed with amorphous products are consequently normally adopted in the field, to balance their properties (e.g. U.S. Pat. No. 4,507,515 and U.S. Pat. No. 3,697,429); completely amorphous products are quite often used.

Degradation techniques in batch masticators are known, wherein the polymeric bases undergo an oxidative treatment. The process does not allow an optimum productivity, however, and in most of these process the polymer is subsequently dissolved in the oil and transported in a concentrated solution with a consequent increase in the transport costs.

Other processes, well known to experts in the field, are based on the shear degradation of standard polymers in solution; also in this case, however, the productivity and transport costs are jeopardizing.

All in all, the process which allows the most advantageous molecular weight reduction of standard EP(D)M polymers to obtain solid OCP, is the extrusion process mentioned for example in the patent CA-A-991792.

This document, however, does not provide technological solutions capable of allowing the recovery of the product when this is amorphous.

When used in the treatment of semi-crystalline high ethylene products or mixtures prevalently having a semicrystalline base, the process of CA-A-991792 can, in fact, be, and is, widely used. In the case of amorphous products, on the contrary, the recovery of a product having a poor dimensional stability becomes quite critical, above all in relation to the low molecular weight so obtained.

If an amorphous or prevalently amorphous product is to be extruded, the running of the operations downstream of the extrusion itself become extremely critical. Among the most widely used techniques in this field, those which are most suitable envisage cutting the polymer in water at the extruder outlet. If the polymer is not amorphous (or is below the glass transition temperature), the rapid cooling produces a quick hardening of the pellets with the consequent possibility of recovering it by centrifugation and/or sieving and removing the residual humidity.

Amorphous products, on the other hand, above all if they have a low molecular weight, as required by V.I.I. applications, do not acquire a sufficient stiffness as it is not possible to rely on a crystallization. The products not only become tacky but also have a low consistency and tend to become blocked in various points of the plant.

This critical shape becomes even more evident considering that extrusion degradation processes can be carried out in non-specific plants, by modifying and adapting the screw and thermal profiles: under these conditions, the economical handling of the process becomes even more advantageous and flexible, provided the recovery systems of the material used in normal extrusion lines for polymeric materials can also process the degraded product. This certainly does not occur if the end-product is amorphous or prevalently amorphous.

For this reason, amorphous products degraded to molecular weights which can be used in the V.I.I. field, are characterized by finishings which provide for the direct dissolution of the polymer in oil (as described in U.S. Pat. No. 4,464,493). Under these conditions, however, most of the advantages of the process itself are lost, as it is then necessary to move large volumes of liquid rather than smaller volumes of solid polymer and plants of this type are obviously exclusively dedicated to these processings.

It is also possible to obtain low molecular weight and amorphous products in polymerization. In this case, the products thus obtained, with the same drawbacks described above, tend to create problems in the various product recovery phases (stripper, extrusion, etc.). These productions are normally characterized by a low productivity and frequent run interruptions.

A process has now been found which overcomes the disadvantages specified above.

In accordance with this, the present invention relates to a process for the preparation of viscosity index improver additives (V.I.I.) which comprises the treatment under high shear conditions of a composition comprising: (i) one or more EP(D)M polymers and (ii) one or more polyvinylarene/hydrogenated conjugated polydiene/polyvinylarene block copolymers, the weight ratio (i)/(ii) ranging from 98:2 to 80:20, preferably from 97:3 to 90:10, the above process being carried out at a temperature ranging from 150° C. to 400° C., preferably from 180° C. to 320° C.

Figure 1:
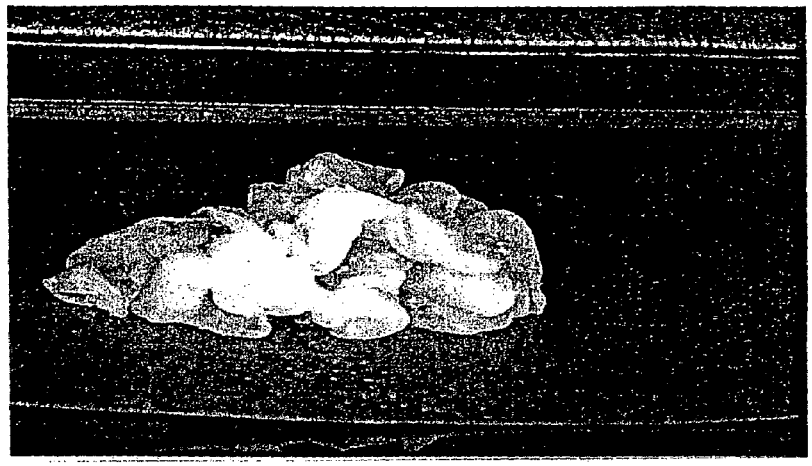
FIG. 1 is a photograph of the material of Example 1 after 2 days at room temperature.

The term "high shear" refers to shear values higher than 75 sec$^{-1}$, more preferably higher than 400 sec$^{-1}$. The process of the present invention can be effected using common transformation machines of polymeric materials which allow these shear values, for example extruders in continuous or, preferably, twin-screw extruders or extruders of the ko-kneter type. These types of extruder are those which ensure sufficient mastication. The extrusion plant is generally made up of a feeding area in which gravimetric or volumetric batchers dose the various components and sent them to the extruder inlet.

The singly, twin-screw (co—or counter-rotating), ko-kneter extruder heats the granules of the products fed and sends them towards a mixing zone. The combined temperature, mixing and compression effect on the product leads to the plasticization of the various polymeric bases and, by continuing and/or intensifying the process, to close mixing and degradation. The duration of the process must not exceed 150 seconds, preferably 90 seconds, as this would lead to an uncontrolled degradation of the materials fed.

In the simplest embodiment of the present invention, to which the experimental experiments correspond, the block copolymer is fed together with the EP(D)M polymeric base; it is possible, however, to feed the block copolymer to a separate area of the extruder after the feeding of the EP(D)M base, which is sufficient, however, to guarantee its close mixing.

The term EP(D)M refers to both EPM (ethylene-propylene) copolymers and EPDM (ethylene-propylene-non-conjugated diene) terpolymers, in which the weight content of ethylene ranges from 85% to 40%, preferably from 76% to 45%. The possible non-conjugated diene is present in a maximum quantity of 12% by weight, preferably 5% by weight, even more preferably it is zero. EP(D)M polymers generally have the following properties:

Weight average molecular weight ($M_w$) ranging from 70,000 to 500,000, preferably from 90,000 to 450,000;

Polydispersity expressed as $M_w/M_n$ lower than 5, preferably from 1.8 to 4.9:

Ratio between Melt Index fluidity with a weight of 21.6 kg and Melt Index fluidity with a weight of 2.16 kg, both effected at a temperature of 230° C., ranging from 18 to 60, preferably from 20 to 40.

The molecular weight $M_w$ is determined through GPC with a refraction index detector.

In the case of EPDM, the diene is selected from:

linear chain dienes such as 1,4-hexadiene and 1,6-octadiene;

branched chain acyclic dienes such as 5-methyl-1,4-hexadiene; 3,7-dimethyl-1,6-octadiene; 3,7-dimethyl-1,7-octadiene;

single ring alicyclic dienes such as 1,4-cyclohexadiene; 1,5-cyclo-octadiene; 1,5-cyclododecadiene;

dienes having condensed and bridged alicyclic rings, such as methyltetrahydroindene; dicyclopentadiene; bicyclo [2.2.1] hepta-2,5-diene; alkenyl, alkylidene, cyclo-alkenyl and cyclo-alkylidene norbornenes such as 5-methylene-2-norbornene; 5-ethylidene-2-norbornene (ENB); 5-propenyl-2-norbornene.

In the preferred embodiment, the preferred diene is 5-ethylidene-2-norbornene (ENB).

The process of the present invention is applied to both amorphous and semi-crystalline EP(D)M polymers and the related mixtures, more specifically amorphous EP(D)M. It should be remembered that amorphous EP(D)M polymers have an ethylene content ranging from 62% to 40% by weight, preferably from 55% to 45% by weight. Semi-crystalline EP(D)M polymers, on the other hand, are characterized by an ethylene weight content ranging from 85% to 63% by weight, preferably from 76 to 68% by weight.

Amorphous ethylene-propylene copolymers cannot be easily fed to extruders as they have a low shape stability even when they have a high molecular weight. The presence of block copolymers, particularly in powder form, resolves this problem.

The molecular weight of EP(D)M polymers is not a critical aspect of the process; it is preferable however to have a weight average molecular weight higher than 150,000 to avoid problems in the feeding to the extruder. Exceeding a molecular weight of 250,000, on the other hand, is not advisable, to avoid having excessive energy consumption and reaching the maximum couple allowable for the extruder motor.

The component indicated as hydrogenated block copolymer is characterized by a block structure in which polyvinylarene chains, preferably polystyrene chains, alternate with hydrogenated conjugated polydiolefinic chains.

Typically obtained by in different steps anionic catalysis, block copolymers have structures which are well known to experts in the field; they consist of a soft part and a hard part. The soft part is selected from hydrogenated polybutadiene, hydrogenated polyisoprene, hydrogenated isoprene-butadiene copolymer.

The hard part, on the other hand, consists of pieces of polyvinylarene chain.

In the preferred embodiment, the block copolymer is selected from SEBS block, i.e. styrene/ethylene-butene/styrene copolymers.

The hydrogenated block copolymer which can be used in the process of the present invention has a vinylaromatic content, preferably styrene, ranging from 15 to 50%. The same product therefore has from 85 to 50% of hydrogenated conjugated diolefinic units, the above hydrogenated conjugated diolefinic units being selected from butadiene, isoprene, butadiene-isoprene copolymer, and relative mixtures. If butadiene is used, at least 20% is with a 1,2 configuration.

The molecular weight of the hydrogenated block copolymer ranges from 45,000 to 250,000, preferably from 50,000 to 200,000.

The ratio between the EP(D)M polymer and block copolymer can range from 98:2 to 80:20, due to the cost of hydrogenated block copolymers, however, it is preferable to maintain a ratio of 97:3 to 90:10.

These low quantities of hydrogenated block copolymer can also be advantageous for the fact that, as they do not enter into the final formulation in sufficient quantities to influence the performances, the choice of the most economical and performing product, with respect to shape stability, is much wider.

In the case of amorphous EP(D)M polymers mixed with semi-crystalline products, the presence of the hydrogenated block copolymer produces an improvement in the recovery of the extruded granules and it is an extremely useful anti-packing agent for the amorphous base, in the feeding.

The process of the present invention therefore allows an OCP additive to be obtained, characterized by improved shape stability.

Furthermore, the process of the present invention enables the normal finishing techniques for plastic materials to be used and also makes it possible to recover the product.

The invention consequently consists of a transformation process wherein the ethylene copolymer or terpolymer, mixed with hydrogenated block copolymers, is subjected to treatment for reducing the molecular weight under high shear and high temperature conditions.

It is also possible to carry out the degradation process under the conditions described in Italian patent application MI98A 002774, filed by the same applicant, i.e. in the presence of a substance of a hydroperoxidic nature under high shear conditions and at moderate temperatures with respect to traditional thermo-degradation.

In this case, there are two advantages, i.e. the lower extrusion temperatures and the light branching, which allow a better handling of the product.

Finally, it is possible to carry out the degradation process under the conditions described in Italian patent application Nr. MI2004A 000751, filed by the same applicant, in the presence of a substance of a hydroperoxidic nature under high shear conditions and regulating the branching degree by the dosage of a polyfunctional vinyl monomer.

It is also possible to feed the block copolymer directly to the downstream phase of the polymerization in the industrial production plant of the generating polymeric base.

In a further optional embodiment of the present invention, the process of the present invention can be carried out inside the finishing phase of the production process of the generating polymer base. In this case, all or, preferably, part of the polymer in the finishing phase (before the final forming), would be removed from the standard flow and sent to the transformation machine selected for the process, object of the invention.

The present invention also relates to the use of the products obtained according to the process of claim 1 as viscosity index improver (V.I.I.) additives.

The following examples are provided for a better understanding of the present invention.

EXAMPLES

Material:
Dutral$^R$ CO058 ethylene-propylene copolymer—Polimeri Europa.
  48% by weight of propylene
  ML (1+4) at 100° C.=78
  MFI (L)=0.6
Europrene$^R$ SOL TH 2315 Polimeri Europa (SEBS copolymer)
  30% by weight of styrene
  Mw=170,000
  40% of 1-2 configuration butadiene (vinyl)
Europrene$^R$ SOL TH 2312 Polimeri Europa (SEBS copolymer)
  30% by weight of styrene
  Mw=75,000
  40% of 1-2 configuration butadiene (vinyl)

All examples 1–4 are carried out using a co-rotating twin-screw extruder of the Maris TM35V type, with a screw profile and rotation rate thereof which are such as to have a shear rate of about 1000 sec$^{-1}$ and a process time of about 1 minute (60 seconds).

Example 1

Reference 22

The following polymeric base was fed to a twin-screw extruder of the Maris TM 35V type, L/D=32, maximum temperature 250° C., RPM=275:
92 phr CO058
8 phr SOLTH 2315 ground (used as anti-packing agent).

A product was recovered and subsequently calendered at 130° C.

The Mooney viscosity and Mooney relaxation was effected on this product, at 100° C. according to regulation ASTM D1646-03.
ML (1+4) at 100° C.=11.3
Slope >1
Area <10
A/ML <1

The product is evidently linear and absolutely non-elastic at 100° C.:
MFI (L)=9.92 g/10'
MFI (E)=5.2 g/10'

A shape stability experiment was effected (ref: 16539/27).

Cubes having a side of about 5 mm were cut from a calendered sheet of the product of example 1.

A handful of these cubes was stacked to form a "pyramid". After 2 days, at room temperature, the stack had surprisingly not completely collapsed and it was easy to recognize the original particles (see FIG. 1, which is a photograph of the product after 2 days at room temperature).

Evaluation as V.I.I. (Viscosity Index Improver) Additives

The product of Example 1 was dissolved to 1.0 and 1.2 w/w in reference oil SN 150 containing 0.3% of PPD (Pour Point Depressant) additive, in order to evaluate its low temperature properties.

The oil base SN 150 has the following characteristics:
Kinematic viscosity KV 100° C.=5.3 cSt
Fix Point=−36.3° C. (Pour Point=−36° C.).

Fix point refers to the freezing point determined by means of an automatic temperature scanning instrument. The pour point is equal to the fix point but with an approximation of three degrees higher.

|  | Fix Point ° C. | KV 100° C. cSt |
|---|---|---|
| Reference oil base | −36.3 | 5.3 |
| Sol. 1.2% Example 1 | −35.9 | 12.0 |
| Sol. 1.0% Example 1 | −36.3 | 10.3 |

From the comparative data, it can be deduced that the product obtained according to the present invention can be used as a V.I.I. additive in the lubricating oil sector, without any particular counterindications, as it is possible however to rely on the low temperature properties in line with amorphous products (pour point absolutely similar to the oil base containing PPD, or no interference). As an example, a commercial amorphous product, used as OCP additive, dissolved at 1% in the same reference oil has a fix point=−35.7%.

This experimental datum confirms that, by introducing small quantities of SEBS-type copolymer, there are no evident counterindications on the final application.

Furthermore the solutions of the products relating to the examples of the present invention are absolutely clear.

Comparative Example 2

Reference 28

The following polymeric base was fed to a twin-screw extruder of the Maris TM 35V type, L/D=32, maximum temperature 250° C., RPM=275:
100 phr CO058

A product was recovered, which was subsequently homogenized in a calender having a MFI (E)=4.8.

Example 3

Reference 27

The following polymeric base was fed to a twin-screw extruder of the Maris TM 35V type, L/D=32, maximum temperature 250° C., RPM=275:
92 phr CO058
8 phr SOLTH 2315
A product was recovered, which was subsequently homogenized in a calender having a MFI (E)=4.4.

Example 4

Reference 27.1

The following polymeric base was fed to a twin-screw extruder of the Maris TM 35V type, L/D=32, maximum temperature 250° C., RPM=275:
92 phr CO058
8 phr SOLTH 2312
A product was recovered and subsequently calendered at 130° C., having a MFI (E)=4.4.

Evaluation of the Products of Examples 2c–4

Figure 2:
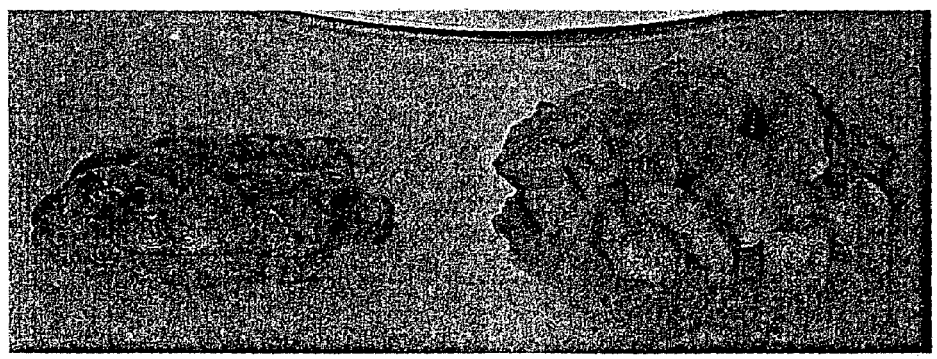
FIG. 2 shows the differences between the test carried out with the product of invention Example 3 (on the right) and Comparative Example 2 (on the left).

The products of Examples 2c–4 were calendered and, once cooled, cut into cubes and stacked as in the shape stability test (reference 16539/27) described above. After two days, the products of Examples 3 and 4, analogously to the product of Example 1, even though agglomerated, had only minimally collapsed and it was easy to recognize the original particles. The product of comparative example 2, on the contrary, had completely collapsed (see FIG. 2).

The figure provided below (FIG. 2) indicates the differences between the test carried out with the product of the invention example 3 (on the right) and comparative example 2 (on the left).

Characterization of Experimental Examples: 1–4

| Example | Mw | Mw/Mn |
|---|---|---|
| 1 | 85000 | 2.1 |
| Comparative 2 | 93000 | 1.9 |
| 3 | 88000 | 2.0 |
| 4 | 90000 | 1.9 |

Comparative Example 5

The same formulation as example 1 was subjected to degradation in a 70 cc chamber plastograph, correlated by roller-type rotors having a rotation rate ranging from 50 to 200 rpm with temperatures of the polymer ranging from 210 to 285° C. for a time of 4 minutes.

The product was calendered and, once cooled, cut into cubes and stacked as in the reference test 16539/27 described above. After a day, the product had completely collapsed, the original pieces were undistinguishable.
MFI (E)=5.3 g/10'

Comparative Example 6

A sample of Dutral CO058 was subjected to degradation in a 70 cc chamber plastograph, correlated by roller-type rotors having a rotation rate ranging from 50 to 200 rpm with temperatures of the polymer ranging from 210 to 285° C. for a time of 4 minutes.

The product was calendered and, once cooled, cut into cubes and stacked as in the reference test 16539/27 described above. After a day, the product had completely collapsed, the original pieces were undistinguishable.
MFI (E)=4.0 g/10'

Comments on Examples 5 and 6

Comparative examples 5 and 6 describe the innovativeness of the process, object of the present invention. They demonstrate, in fact, that it is absolutely not sufficient to thermo-mechanically degrade the product to obtain an advantage in the shape stability. It is necessary, on the other hand, to use a hydrogenated block copolymer, respecting the process conditions, in particular the times.

The invention claimed is:

1. A process for the preparation of a viscosity index improver comprising treatment, under high shear conditions having a shear rate higher than 75 sec$^{-1}$, of a composition comprising: (i) one or more EP(D)M polymers and (ii) one or more polyvinylarene/hydrogenated conjugated diene/polyvinylarene block copolymers, the weight ratio (i)/(ii) ranging from 98:2 to 80:20, the treatment being carried out at a temperature ranging from 150° C. to 400° C.

2. The process according to claim 1, wherein the weight ratio (i)/(ii) ranges from 97:3 to 90:10.

3. The process according to claim 1, wherein the treatment is carried out at a temperature ranging from 180° C. to 320° C.

4. The process according to claim 1, wherein the EP(D)M polymers are selected from EPM (ethylene-propylene) copolymers and EPDM(ethylene-propylene-non-conjugated diene) ter-polymers, wherein the ethylene weight content ranges from 85% to 40%.

5. The process according to claim 4, wherein the ethylene content ranges from 76% to 45%.

6. The process according to claim 1, wherein the treatment is carried out at a shear value higher than 400 sec$^{-1}$.

7. The process according to claim 1, wherein the treatment is carried out at a shear value of about 1000 sec$^{-1}$ for about 1 minute.

8. The process according to claim 1, wherein the treatment is carried out for a time of not more than 150 seconds.

9. The process according to claim 8, wherein the treatment is carried out for a time of not more than 90 seconds.

10. The process according to claim 1, wherein the polyvinylarene present in the block copolymers is polystyrene.

11. The process according to claim 1, wherein the hydrogenated conjugated diene present in the block copolymers is selected from hydrogenated polybutadiene and hydrogenated polyisoprene.

12. The process according to claim 1, wherein the treatment is carried out in an extruder.

13. The process according to claim 1, wherein the EP(D)M polymer is amorphous, having an ethylene content ranging from 62% to 40% by weight.

14. The process according to claim 13, wherein the EP(D)M polymer is amorphous, having an ethylene content ranging from 55% to 45% by weight.

15. The process according to claim 1, wherein the composition treated consists of (i) one or more EP(D)M polymers and (ii) one or more polyvinylarene/hydrogenated conjugated diene/polyvinylarene block copolymers, and wherein no additives are present or added to the composition during treatment.

16. The process according to claim 1, wherein the composition comprises one or more SEBS block copolymers.

17. The process according to claim 15, wherein the composition comprises one or more SEBS block copolymers, the process is carried out at a shear value higher than 400 $sec^{-1}$ for not more than 150 seconds, and wherein the EP(D)M polymers are selected from EPM (ethylene-propylene) copolymers and EPDM(ethylene-propylene-non-conjugated diene) ter-polymers, the ethylene weight content thereof ranging from 85% to 40%.

18. A viscosity index improver prepared according to the method of claim 1.

19. A composition comprising oil and the viscosity index improver of claim 18.

* * * * *